United States Patent
Rawlins et al.

(10) Patent No.: US 9,647,414 B2
(45) Date of Patent: May 9, 2017

(54) OPTICALLY PUMPED MICRO-PLASMA

(71) Applicant: Physical Sciences, Inc., Andover, MA (US)

(72) Inventors: W. Terry Rawlins, Reading, MA (US); Steven J. Davis, Londonberry, NH (US); Kristin Galbally-Kinney, Littleton, MA (US); Jeffrey Hopwood, Needham, MA (US); Alan Hoskinson, Lexington, MA (US)

(73) Assignee: Physical Sciences, Inc., Andover, MA (US)

( * ) Notice: Subject to any disclaimer, the term of this patent is extended or adjusted under 35 U.S.C. 154(b) by 441 days.

(21) Appl. No.: 14/168,851

(22) Filed: Jan. 30, 2014

(65) Prior Publication Data

US 2016/0301182 A1     Oct. 13, 2016

(51) Int. Cl.
| | | |
|---|---|---|
| *H01S 3/30* | (2006.01) | |
| *H01S 3/0943* | (2006.01) | |
| *H01S 3/095* | (2006.01) | |
| *H01S 3/22* | (2006.01) | |
| *H01S 3/07* | (2006.01) | |
| *H01S 3/223* | (2006.01) | |

(52) U.S. Cl.
CPC .......... *H01S 3/0943* (2013.01); *H01S 3/095* (2013.01); *H01S 3/2207* (2013.01); *H01S 3/073* (2013.01); *H01S 3/2237* (2013.01)

(58) Field of Classification Search
CPC .... H01S 3/0387; H01S 3/0385; H01S 3/0384; H01S 3/0382; H01S 3/0381

USPC .......................................... 372/5, 55, 57, 64
See application file for complete search history.

(56) References Cited

U.S. PATENT DOCUMENTS

| | | | | |
|---|---|---|---|---|
| 4,446,556 A | * | 5/1984 | Koepf | H01S 3/08 |
| | | | | 372/103 |
| 4,648,092 A | * | 3/1987 | Ewbank | H01S 3/10076 |
| | | | | 372/18 |
| 6,917,165 B2 | | 7/2005 | Hopwood et al. | |
| 8,634,441 B2 | * | 1/2014 | Onose | H01S 3/0085 |
| | | | | 372/21 |
| 9,460,884 B2 | | 10/2016 | Hopwood et al. | |

FOREIGN PATENT DOCUMENTS

| | | |
|---|---|---|
| WO | 2010129277 | 11/2010 |
| WO | WO2013/016497 A2 | 1/2013 |

OTHER PUBLICATIONS

Jiande Han and Michael C. Heaven; "Gain and lasing of optically pumped metastable rare gas atoms"; Optics Letters, Jun. 1, 2012, 3 pages, vol. 37, Optical Society of America.
(Continued)

*Primary Examiner* — Tuan Nguyen
(74) *Attorney, Agent, or Firm* — Proskauer Rose LLP

(57) ABSTRACT

A laser and methods for providing a continuous wave output beam. The laser and method includes positioning a micro-plasma chip capable of creating micro-plasmas within a resonant cavity. A gas is input into the resonant cavity and flows around the micro-plasma chip. Micro-plasmas ignite and excite the gas to create metastables. The metastables are further excited by an optical pump having an energy sufficient to cause the metastables to lase.

14 Claims, 10 Drawing Sheets

(56) References Cited

OTHER PUBLICATIONS

J. Hopwood, F Iza, S Coy and D. B. Fenner, "A microfabricated atmospheric-pressure microplasma source operating in air", Journal of Physics D: Applied Physics, (2005), pp. 1698-1703, vol. 38.
Felipe Iza, Jeffrey A. Hopwood, "Low-Power Microwave Plasma Source Based on a Microstrip Split-Ring Resonator", IEEE Transactions on Plasma Science, Aug. 2003, pp. 782-787, vol. 31, No. 4.
William F. Krupke et al., "Resonance transition 795-nm rubidium laser", Optics Letters, Dec. 1, 2003, pp. 2336-2338, vol. 28, No. 23.
Naoto Miura and Jeffrey Hopwood, "Internal structure of 0.9 GHz microplasma", Journal of Applied Physics, (2011), 6 pgs., vol. 109, American Institute of Physics.
Naoto Miura and Jeffrey Hopwood, "Spatially resolved argon microplasma diagnostics by diode laser absorption", Journal of Applied Physics, (2011), pgs. 6 pgs., vol. 109, American Institute of Physics.
Ralph H. Page et al., "Multimode-diode-pumped gas (alkali-vapor) laser", Optics Letters, Feb. 1, 2006, pp. 353-355, vol. 31, Optical Society of America.
J.D. Readle et al., "Lasing in Cs at 894.3 nm pumped by the dissociation of CsAr excimers", Electronics Letters, Dec. 4, 2008, 2 pgs, vol. 44.
C.Wu et al, "Circular array of stable atmospheric pressure microplasmas", The European Physical Journal D, (2010), pp. 1-5.
C.Wu et al, "Stable linear plasma arrays at atmospheric pressure", Plasma Sources Sci. Technol, (2011), 8 pgs, vol. 20.
Zhi-Bo Zhang and Jeffrey Hopwood, "Linear arrays of stable atmospheric pressure microplasmas", Applied Physics Letters, (2009), vol. 95, 3 pgs.
Borls Shdanov et al., "Diode-pumped 10 W continuous wave cesium laser", Optics Letters, Aug. 1, 2007, pp. 2167-2169, vol. 32, No. 15, Optical Society of America.

\* cited by examiner

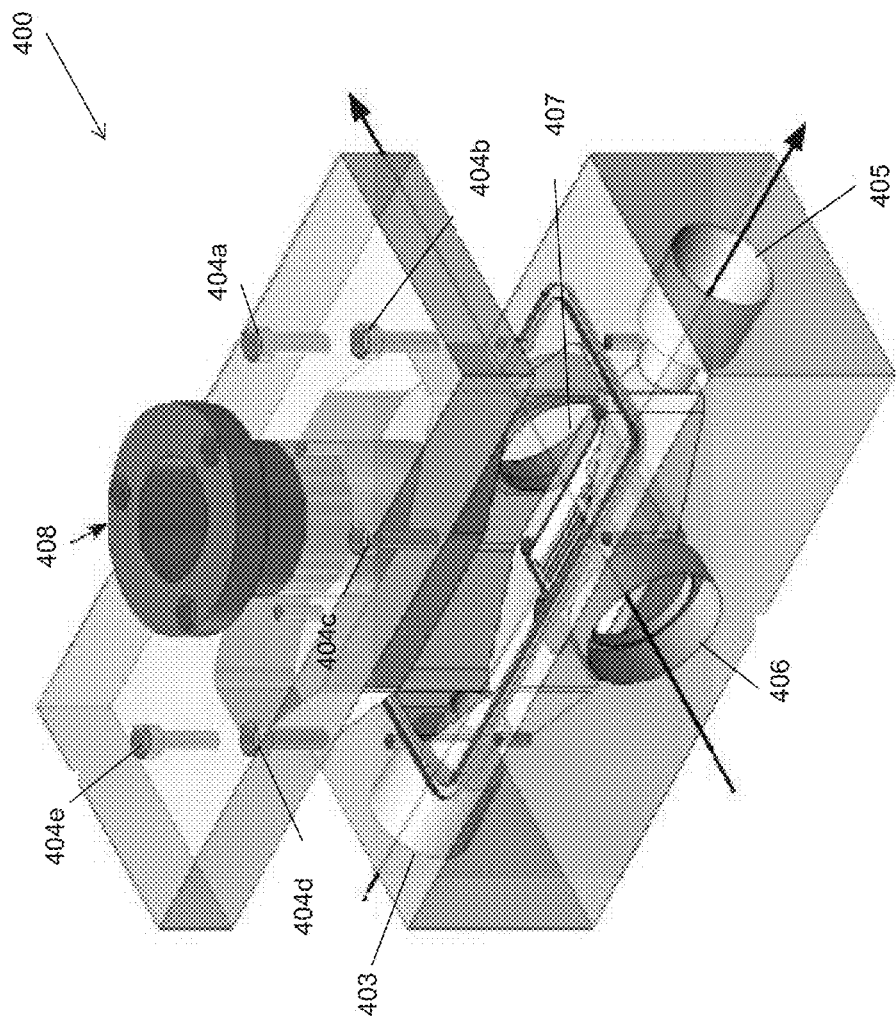

OPTICALLY PUMPED MICRO-PLASMA

GOVERNMENT RIGHTS

The invention was made with government support under U.S. Air Force Contract No. FA8650-11-M-2203, "Radio Frequency (RF) Microplasma for Ozone Generation"; U.S. Air Force Contract No. FA8650-12-C-2312, "RF Microplasmas for Energetic Species Generation"; and U.S. Air Force Contract No. FA8650-11-M-2203, "Diode-Pumped Rare Gas Laser." The government may have certain rights in the invention.

FIELD OF THE INVENTION

This invention relates generally to devices, systems, and methods for gas phase lasers. More specifically, the invention relates to a gas phase laser that is optically pumped and includes a micro-plasma chip.

BACKGROUND OF THE INVENTION

Optically pumped lasers can provide output having wavelengths between ultra-violet and far infrared regions of the electromagnetic spectrum. Current optically pumped lasers include atomic and molecular lasers. Pump sources for optically pumped lasers can include flash lamps, semiconductor lasers, light emitting diodes, solid state lasers, gas lasers, dye lasers, and/or any optical pump source having appropriate wavelengths (e.g., neon: 640.4 nm, argon: 811.7 nm, krypton: 811.5, and xenon: 882.2 nm). Diode lasers can provide higher output powers and higher efficiency in operation compared to flash lamps. For example, diode pumped alkali lasers (DPAL) can be provide high output powers (e.g., over 1 kW output power from a cesium DPAL).

Optically pumped lasers can operate by pumping a ground state of an atom or a molecule to an excited state that either lases or undergoes collisional transfer to a nearby excited state that subsequently lases. FIG. 1 is an exemplary diagram 100 representing multiple states of a gas (atoms or molecules) that is optically pumped. The gas begins in a first ground state (1). The gas is optically pumped (e.g., by a diode) and transitions to a second excited state (2). In the second excited state (2), the gas collides further exciting the gas to a third excited state (3). In the third exited state (3), more collisions occur and the gas continues to have increasing energy, which eventually causes the gas to transition to a fourth excited state (4) of lasing. While optically pumped lasers can lase, they can be limited to gas species types that have ground states that are capable of transitioning by optical excitation.

Additional optically pumped lasers that can lase with the use of rare gas atoms (e.g., argon, krypton, and/or xenon) are available. These lasers typically optically pump from one excited state to another excited state that then lases. These lasers have only operated in a pulsed mode and usually do not operate at atmospheric pressure. Pulsed mode lasers are only "on" for a brief period of time, for example, a few nanoseconds to a fraction of a nanosecond. Therefore, pulsed mode lasers are typically not efficient at delivering a steady output beam. For some applications, e.g., Laser Identification and Ranging (LIDAR), pulse mode is desired, for many other applications, e.g., medical diagnostics, laser machining, and/or other laser material interactions, a continuous wave output beam is desired. Additionally, rare gas atoms are chemically stable and typically do not react with any surface in the laser including the optics. This can enable a lasant to be used indefinitely in a sealed system or readily flowed in a sealed system.

Therefore, it is desirable to lase rare gas atoms with an optical pump in a continuous mode. It is also desirable to lase rare gas atoms at atmospheric pressure.

SUMMARY OF THE INVENTION

Generally, a laser includes a micro-plasma chip positioned within a resonant cavity, an atomic (or molecular) gas flows through the resonant cavity and surrounds the micro-plasma chip. The micro-plasma chip ignites and maintains a plurality of micro-plasmas, the micro-plasmas excite the gas to create metastables (atoms or molecules). An optical pump directs light onto the micro-plasmas and metastables to further excite the metastables to an excitation for which lasing occurs.

Advantages of the claimed invention include high output power (e.g., >1 kW) and higher laser efficiency due to, for example, kinetics and properties of the states of rare gases. Advantages also include high optical gain (e.g., 2.2/cm). High optical gain can allow the optically pumped micro-plasmas to be used as an optical amplifier. Plasma containing metastable atoms can be an amplifying medium when optically pumped. The plasma medium can increase the intensity of a beam of light that has substantially the same optical frequency as the rare gas atomic transitions in the plasma.

Another advantage of the invention is that lasing can occur using rare gases (e.g., neon, krypton, argon and/or xenon), allowing for diversity of output wavelengths. Another advantage is a continuous wave output over a range of wavelengths (e.g., ~650 nm to 1900 nm) over an extended duration (e.g., ~30 minutes). The range of wavelengths can allow for a) atmospheric propagation (certain colors are not absorbed and can propagate long distances, e.g., greater than 1 km, and b) propagation in tissue which can be helpful in, for example, medical applications. The range is also advantageous in laser machining.

Another advantage is ease of circulation of the gas. During high power operation, waste heat is typically unavoidable because the lasers typically operate at wavelengths that are longer than that of the pump laser wavelength. This is known as the "quantum defect". The quantum defect can be high because in high power solid state lasers (e.g., Nd:YAG) it can be difficult to rapidly remove the waste heat. The waste heat can cause optical aberrations in the laser medium. Optical aberrations in the laser medium can cause a degraded beam quality of the laser output beam. A flowing gas lasers that has recirculation of the gas through the laser improves waste heat removal, thus allowing for a better beam quality of the laser output beam.

In one aspect, the invention includes a laser for providing a continuous wave output beam. The laser is configured to receive light from a light source.

The laser includes a micro-plasma chip and a resonant optical cavity for housing the micro-plasma chip at a location that allows a gas flowing within the resonant cavity to surround the micro-plasma chip, such that the micro-plasma chip generates a plurality of micro-plasmas that include excited metastable atoms. The laser also includes an optical pump positioned relative to the micro-plasma chip to direct light from the light source onto the micro-plasmas to optically pump the metastable atoms to cause lasing of the gas sufficient to generate the continuous wave output beam.

In some embodiments, the gas is Argon, Helium, Neon, Krypton, Xenon, Nitrogen, Oxygen or any combination thereof. In some embodiments, the micro-plasma chip operates at a microwave frequency. In some embodiments, the cavity is less than 2 cm in length.

In some embodiments, the laser includes a plurality of resonant optical cavities fluidly connected to each other, each of the plurality of cavities having a micro-plasma chip disposed therein and an optical resonator disposed relative to the micro-plasma chip.

In some embodiments, the micro-plasma chip includes multiple resonators that provide energy to the micro-plasmas. In some embodiments, one of the multiple resonators receives power from a power source, such that said resonator provides power to the remaining resonators of the multiple resonators that do not receive power directly from the power source. In some embodiments, the laser is configured to operate at atmospheric pressure.

In another aspect, the invention involves a method for providing a continuous wave output beam from a laser. The laser configured to receive light from a light source. The method involves providing a flow of gas into a resonant optical cavity and applying power to a micro-plasma chip that is positioned within the resonant cavity at a location that allows the gas to surround the micro-plasma chip causing the micro-plasma chip to generate a plurality of micro-plasmas that include excited metastable atoms. The method also involves directing light from the light source onto the plurality of micro-plasmas to optically pump the metastable atoms to cause lasing of the gas sufficient to generate the continuous wave output beam.

In some embodiments, the method involves operating the micro-plasma chip at a microwave frequency. In some embodiments, the method involves providing a flow of Argon, Helium, Neon, Krypton, Xenon, Oxygen or Nitrogen gas, or any combination thereof, into the resonant optical cavity.

In some embodiments, the method involves providing a plurality of resonant optical cavities fluidly connecting each other, each of the plurality of cavities having a micro-plasma chip disposed therein and an optical resonator disposed relative to the micro-plasma chip.

In some embodiments, the method involves providing power to one resonator of multiple resonators included the micro-plasma chip, such that said resonator provides power to the other resonators of the multiple resonators that do not receive power directly from the power source.

BRIEF DESCRIPTION OF THE DRAWINGS

The advantages of the invention described above, together with further advantages, may be better understood by referring to the following description taken in conjunction with the accompanying drawings. The drawings are not necessarily to scale; emphasis instead is generally placed upon illustrating the principles of the invention.

FIG. 4 is a three-dimensional diagram of a micro-plasma laser, according to an illustrative embodiment of the technology.

DETAILED DESCRIPTION OF THE INVENTION

Generally, a laser includes a micro-plasma chip positioned within a resonant cavity, an atomic (or molecular) gas flows through the resonant cavity and surrounds the micro-plasma chip. The micro-plasma chip ignites and maintains a plurality of micro-plasmas, the micro-plasmas excite the gas to create metastables (atoms or molecules). An optical pump directs light onto the micro-plasmas and metastables to further excite the metastables to an excitation for which lasing occurs.

The micro-plasma chip is located within the resonant optical cavity at a position that allows the gas flow to surround the micro-plasma chip and the light to impinge on the micro-plasmas.

Figure 1:
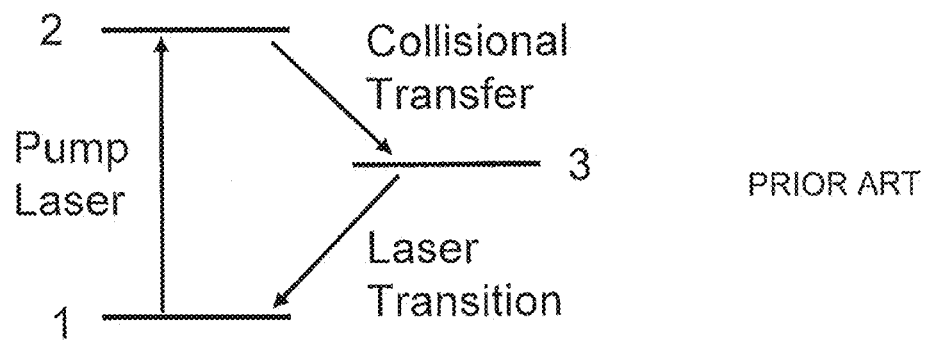
FIG. 1 is an exemplary diagram representing states of gas (atoms or molecules) that are optically pumped, according to the prior art.
Figure 2:
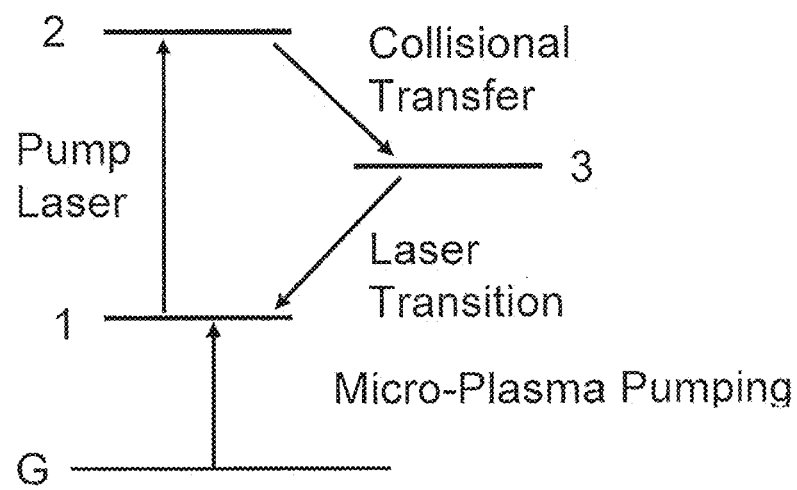
FIG. 2 is an exemplary diagram representing states of gas (atoms or molecules) that are pumped by a micro-plasma discharge to a first excited state before being optically pumped, according to an illustrative embodiment of the technology.

FIG. 2 is an exemplary diagram 201 representing states of gas (atoms or molecules) that are pumped by a micro-plasma discharge to a first excited state before being optically pumped, according to an illustrative embodiment of the technology. The gas starts in a ground state (G). A micro-plasma excites the gas to a first excited state (1) (e.g., transitions the gas to metastables). A light source is impinged on the micro-plasma that optically pumps the metastables from the first excited state (1) to a second excited state (2). In the second excited state (2), the metastables collide further exciting the metastables to a third excited state (3). In the third excited state (3), more collisions as well as further pumping from the micro-plasmas occurs and the gas continues to have increasing energy, which eventually causes the metastables to transition to a fourth excited state (4) of lasing.

Figure 3:
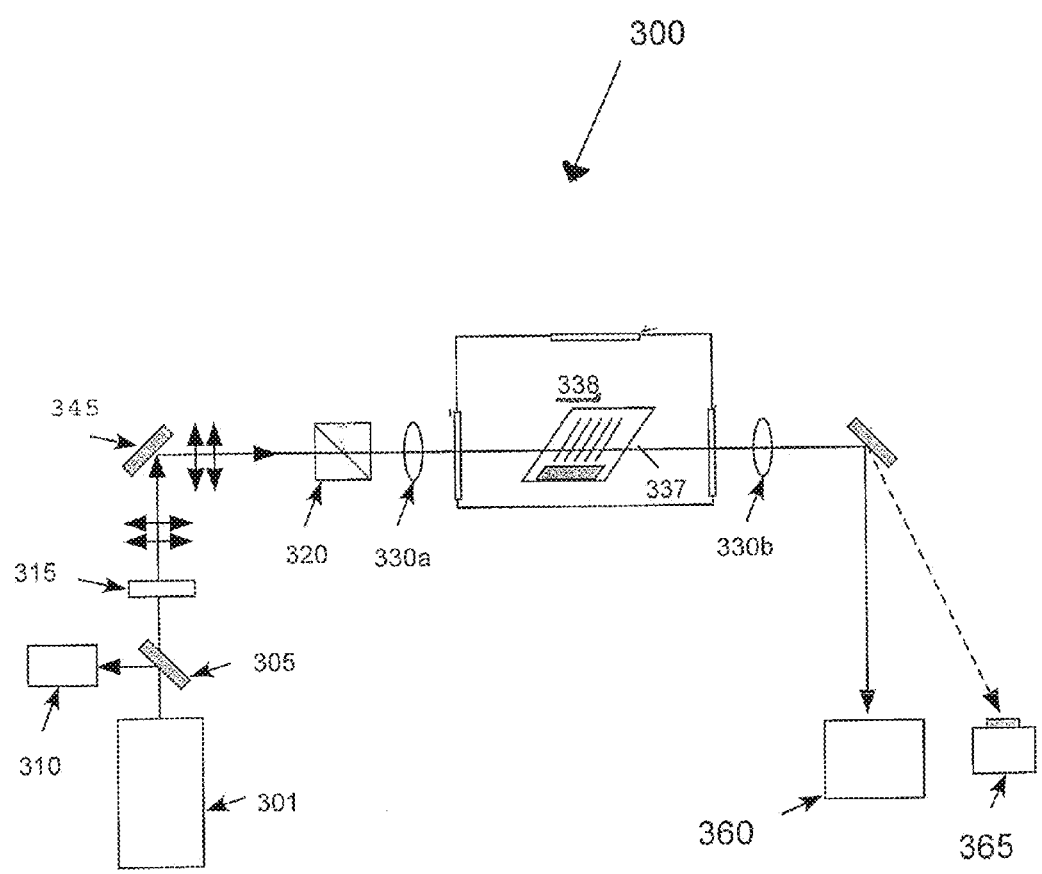
FIG. 3 is a block diagram of a micro-plasma laser system, according to an illustrative embodiment of the technology.

FIG. 3 is a block diagram of a micro-plasma laser system 300, according to an illustrative embodiment of the technology. The micro-plasma laser system includes a resonant optical cavity 338, a micro-plasma chip 337, an optical pump 301, a power meter/beam dump 360, a power meter 365, a wave meter 310, and a plurality of optical elements 305, 315, 345, 320, 330a, 330b, and 348.

The optical pump 301 outputs a pump laser beam that impinges upon optical element 305. In some embodiments, the optical pump 301 is a titanium: sapphire laser, flash lamp, semi-conductor laser, light emitting diode, solid state laser, gas laser, dye laser, and/or any optical pump source having appropriate wavelengths. In some embodiments, the optical pump 301 is any optical pump known in the art to output a beam sufficient to pump metastables produced by the micro-plasmas to transition to lasing (e.g., as in the case of argon gas, a population of $3p^54s$ metastables at atmospheric pressure). The micro-plasma chip 337 is positioned within the resonant optical cavity 338. In some embodiments, optical element 305 is a mirror.

The optical element 305 directs a first portion of the pump laser beam to impinge upon the wave meter 310 and a second portion of the pump laser beam to impinge upon the optical element 315. The wave meter 310 can determine the wavelength of the pump laser beam. Optical element 315 adjusts a polarization of the pump laser beam such that the pump laser beam exits the optical element 315 with a horizontal orientation. In some embodiments, the optical element 315 is a half-wave plate. The optical element 315 rotates the plane polarization of the pump laser beam by 180 degrees to allow injection of the pump laser beam into the resonant optical cavity 338 without having to pass the pump laser beam through a resonant mirror.

The horizontally oriented pump laser beam impinges upon the optical element 345. Optical element 345 reorients the horizontally oriented pump laser beam to a vertical orientation and directs the vertically oriented pump laser beam to impinge upon the optical element 320. The optical element 320 directs the pump laser beam into the resonant optical cavity 338. In some embodiments, the optical element 320 is a beam splitter prism.

The optical element 320 directs the pump laser beam to impinge upon the optical element 330. The optical element 330 directs the pump laser beam towards the resonant optical cavity 338. In some embodiments, the optical element 330 is a focusing lens.

The pump laser beam travels through the resonant optical cavity 338 and impinges upon an area of the micro-plasma chip 337 where micro-plasmas can ignite. The pump laser beam pumps metastables created by the micro-plasmas to an energetic state for which lasing occurs. Once lasing occurs, the output laser beam exits the resonant cavity 338. The output beam can be a continuous wave laser beam.

In some embodiments, an optical pump is positioned to direct a pumping beam substantially orthogonal to the direction of lasing, e.g., side pumping is performed.

The micro-plasma laser system 300 can operate at both above and below atmospheric pressure. In various embodiments, the micro-plasma laser system 300 operates at pressures ranging from 15 torr to 760 torr. The micro-plasma laser system 300 can produce a continuous wave output beam. In some embodiments, the input gas is neon, krypton, argon, xenon or any combination thereof. In some embodiments, the micro-plasma laser system 300 is used produce an energetic excited-state species (e.g., metastable molecular nitrogen, $N_2(A^3\Sigma_u)$ or metastable oxygen ($O_2(a^1\Delta)$).

During operation, the resonant optical cavity 338 receives gas as input (gas input not shown). The gas has a predetermined concentration and a predetermined flow rate. The gas concentration and flow rate can be based on the input pressure and the output pressure of the resonant optical cavity 338. In some embodiments, the gas concentration is argon diluted in helium (e.g., argon diluted in ~2% helium). In some embodiments, the gas concentration is 1% to greater than 10%. In various embodiments, the gas flow rate into the resonant optical cavity 338 ranges from 0.5 mmoles/s to 0.9 mmoles/s.

During operation, the micro-plasma chip 337 receives power from a power source (not shown). The power source provides power to the micro-plasma chip 337 such that micro-plasma can form within the chip. In some embodiments, the power source provides a microwave power. In some embodiments, the microwave power is ~900 MHz. In some embodiments, the microwave power is driven by a power amplifier. The power amplifier can be a 30W, 0.7-2.52 GHz power amplifier. In some embodiments, the power is connected to the micro-discharge chip 337 via coaxial cabling and/or an SMA vacuum feed through on the resonant optical cavity 338.

In some embodiments, the micro-plasma laser system 300 operates with a resonant optical cavity 338 having a pressure of one atmosphere, an optical resonant cavity input gas having a composition of 2% argon, 98% helium and a gas flow rate of 0.0037 moles/s, a micro-plasma discharge gas temperature of ~300° C., a microwave power to micro-plasma discharge of 9 W, and an excitation laser intensity of 1300 W/cm$^2$.

In various embodiments, the micro-plasma laser system 300 operates with a pressure ranging from 0.1 to 1.0 atmosphere, a gas composition ranging from 0.5% to 40% argon, a balance helium, a gas flow rate ranging from 0.0037 to 0.0074 moles/s, a micro-discharge temperature of ~300° C., a microwave power to micro-discharge of 9 W and/or an excitation laser intensity ranging from 500 to 6500 W/cm$^2$. In some embodiments, the micro-plasma laser system 300 operates with a pressure that can be greater than an atmosphere.

In various embodiments, the micro-plasma laser system 300 operates with a pressure that is greater than or equal to 0.01 atmosphere, a gas composition ranging from 0.1% to 100% lasant parent gas, a balance helium or argon diluent, a gas flow rate greater than or equal to 0.001 mole/s, a micro-discharge temperature greater than or equal to 20° C., a microwave power to discharge greater than or equal to 5 W and/or an excitation laser intensity greater than or equal to 500 W/cm$^2$.

FIG. 4 is a three-dimensional diagram of a micro-plasma laser 400, according to an illustrative embodiment of the technology. The micro-plasma laser 400 includes a resonant optical cavity 401, a micro-plasma chip 402, a gas input 403, multiple gas outputs 404a, 404b, 404c, 404d, 404e, generally, 404, laser beam output 405, an optical pump input 406, an optical pump output 407, and an optical window 408.

The resonant optical cavity 401 has the micro-plasma chip 402 positioned therein. A gas flows into the resonant optical cavity 401 via gas input 403. During operation, the micro-plasma chip 402 is powered with a power source (not shown). The gas surrounds the micro-plasma chip 402 and micro-plasmas ignite. The micro-plasmas create metastables from the surrounding gas.

An optical pump (not shown) directs light through the optical pump input 406. The micro-plasma chip 402 is positioned such that the directed light impinges upon the micro-plasma chip 402 at a location along a portion of the chip where the micro-plasmas exist and at a location where there is a high concentration of metastables. The metastables are excited by the light such that lasing occurs. The output laser beam exits the resonant optical cavity 402 via the laser beam output 405. The portion of the directed light that does not energize the metastables exits the resonant optical cavity 402 at the optical pump output 407. Unused gas exits the resonant optical cavity 402 at the gas outputs 404. In some embodiments, the resonant optical cavity 402 is a glass-filled Teflon flow plenum.

Figure 5A:
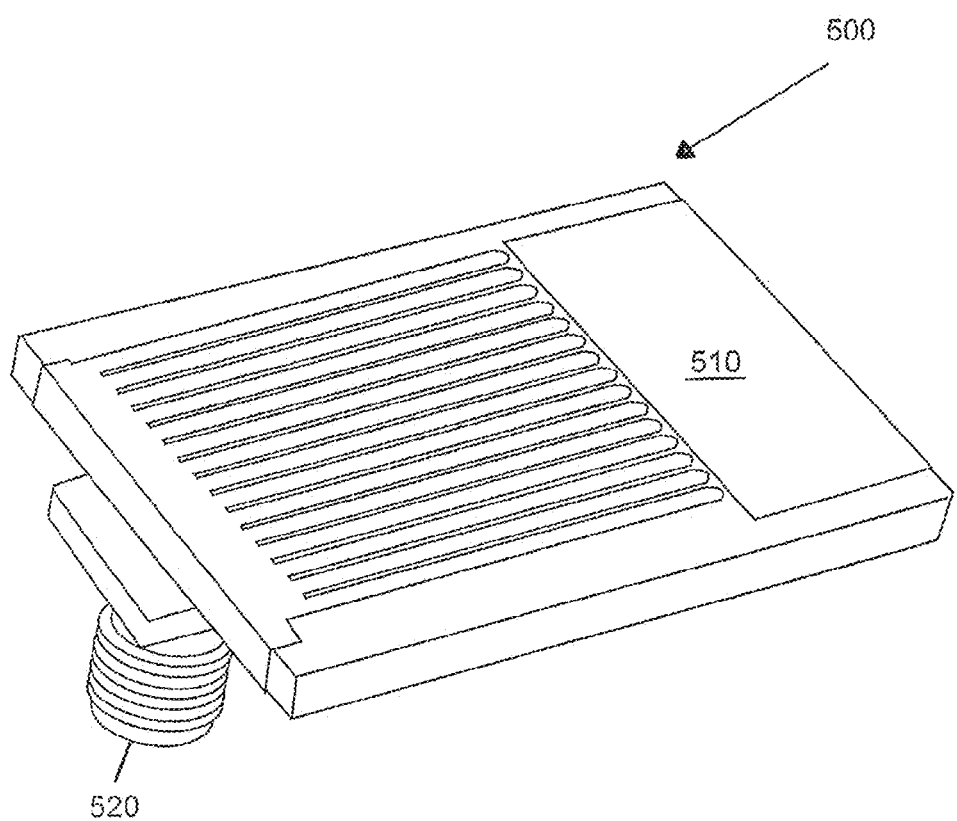
FIG. 5A is a three-dimensional diagram of a micro-plasma chip, according to an illustrative embodiment of the technology.
Figure 5B:
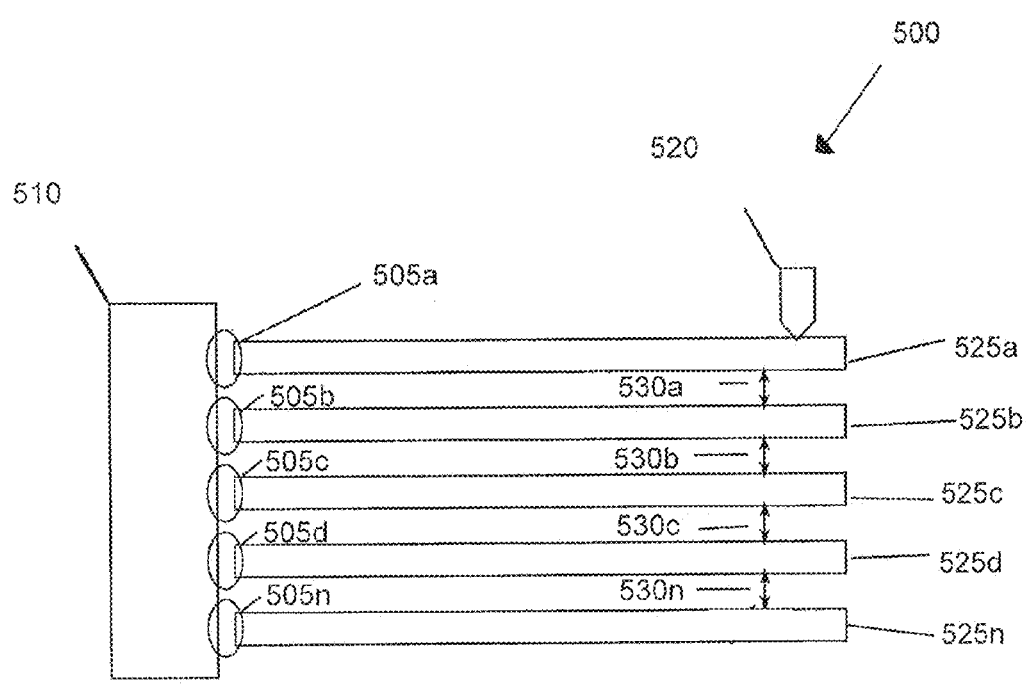
FIG. 5B is a two-dimensional diagram of a portion of the micro-plasma chip of FIG. 5A.

FIG. 5A is a three-dimensional diagram of a micro-plasma chip 500, according to an illustrative embodiment of the technology. FIG. 5B is a two-dimensional diagram of a portion of the micro-plasma chip 500, according to an illustrative embodiment of the technology.

The micro-plasma chip 500 includes a ground strip 510, a power input 520, a plurality of resonators, 525a, 525b, 525c, 525d, . . . , 525n, generally 525 and insulating material 530a, 530b, 530c, . . . 530n. During operation, a power is applied to the micro-plasma chip via the power input 520. A gas flow is provided such that the gas surrounds the chip. The plurality of resonator 525 ignite micro-plasmas in the regions of plasma 505a, 505b, 505c, 505d, . . . , 505n, generally 505. In some embodiments, the number of resonators is 15. It is apparent to those skilled in the art that any number of resonators that causes a micro-plasma to transition gas to a metastable state sufficient to be pumped for lasing can be used.

In one exemplary embodiment, the micro-plasma chip 500 can provide a plasma power of ~3 watts. The micro-plasma chip can have a plasma ignition voltage of less than 20 volts, a plasma sustaining voltage of less than 20 volts, an operating frequency of 915 megahertz, an electrode sputtering that is negligible, a mode of operation that is continuous, and any combination thereof. In embodiments where argon is the input gas, the average electron density in is $\sim 10^{14}$ cm$^{-3}$.

The micro-plasma chip 500 can be any micro-plasma chip as known in the art. For example, the micro-plasma chip 500 can be a micro-plasma chip as shown in WO Publication No. 2012/129277 by Hopwood et al, the entire contents of which are incorporated herein by reference.

Figure 6A:
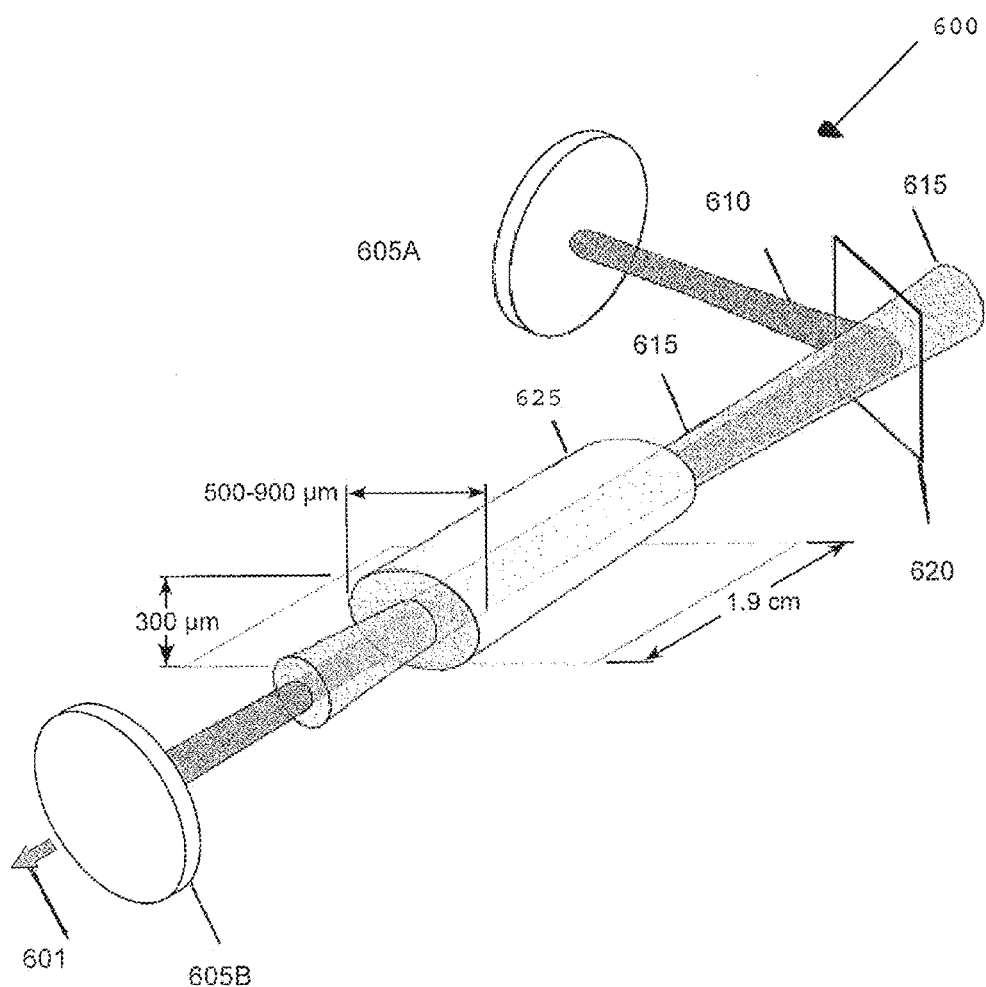
FIG. 6A is a three dimensional diagram showing positioning of elements of a laser, according to an illustrative embodiment of the technology.

FIG. 6A is a three dimensional diagram 600 showing positioning of elements of a laser, according to an illustrative embodiment of the technology. A pump laser beam 615 is impinged upon a beam splitter 620 from, for example, a Ti:S laser (not shown). The beam splitter 620 splits the pump laser beam 615 such that a first portion of the beam directly impinges upon a region of micro-plasma 625 (e.g., the micro-plasma generated by the micro-plasma chip 337 as discussed above in FIG. 4) and a second portion of the beam 610 impinges upon a resonator mirror 605a. The resonator mirror 605a reflects light into the region of micro-plasma 620. The region of micro-plasma 620 includes a volume outside of a micro-chip that contains metastable atoms that are created by the micro-chip. The metastable atoms can be optically excited and lased.

The pump laser beam 615 is directed to the region of micro-plasma 620 and impinges upon the resonator mirror 605b. The resonator mirror 605b reflects the pump laser beam 615 through the region of micro-plasma 620. During operation, lasing occurs and an output laser beam 601 exits the laser. In one exemplary embodiment, the region of plasma 620 is ~1.9 centimeters long, 300 micrometers high and 500 to 900 micrometers wide.

In some embodiments, the resonant mirrors have an ~15% transmission for an optical pump of 912 nm. In some embodiments, the optical conversion efficiency is 55%.

Figure 6B:
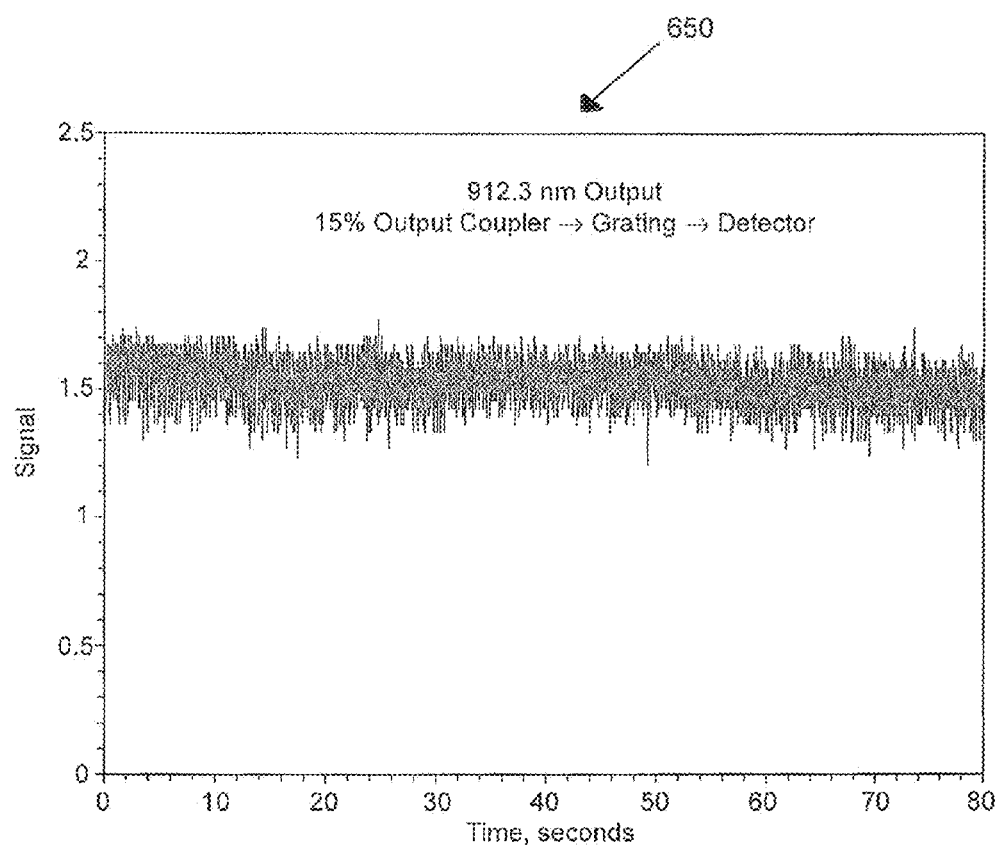
FIG. 6B is a graph showing laser output power vs. time for an embodiment of the laser configured according to FIG. 6A.

FIG. 6B is a graph 650 showing laser output power vs. time for an embodiment of the laser configured according to FIG. 6A.

Figure 7:
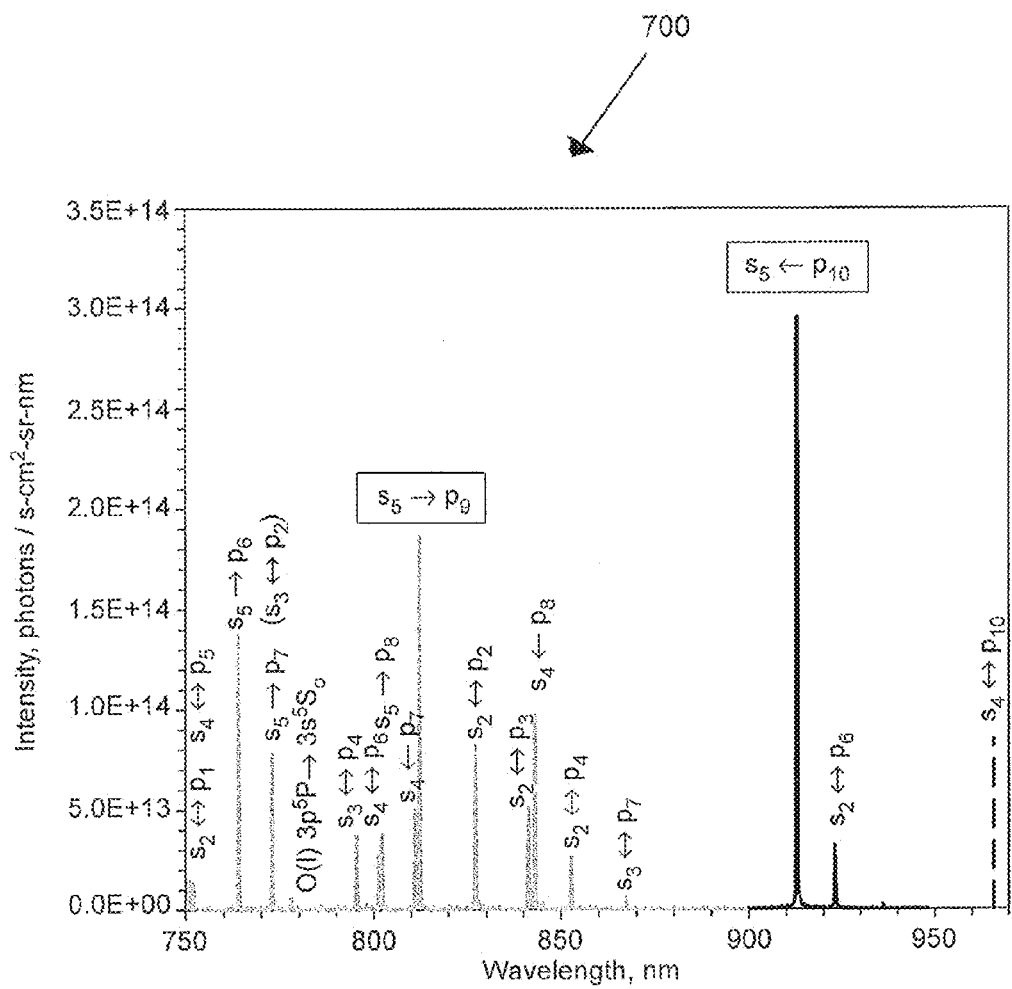
FIG. 7 is a graph showing spectra for excited argon species produced by a micro-plasma, according to an illustrative embodiment of the technology.

FIG. 7 is a graph 700 showing spectra for excited argon species produced by a micro-plasma, according to an illustrative embodiment of the technology. The spectra in graph 600 are for a micro-plasma chip (e.g., the micro-plasma generated by the micro-plasma chip 337 as discussed above in FIG. 4) having 15 resonators with a gas flow of argon and an optical pump of a Ti:S continuous wave laser. The spectra show an intense emission (e.g., S5->P9) for several argon states in the 12-14 eV range.

Figure 8:
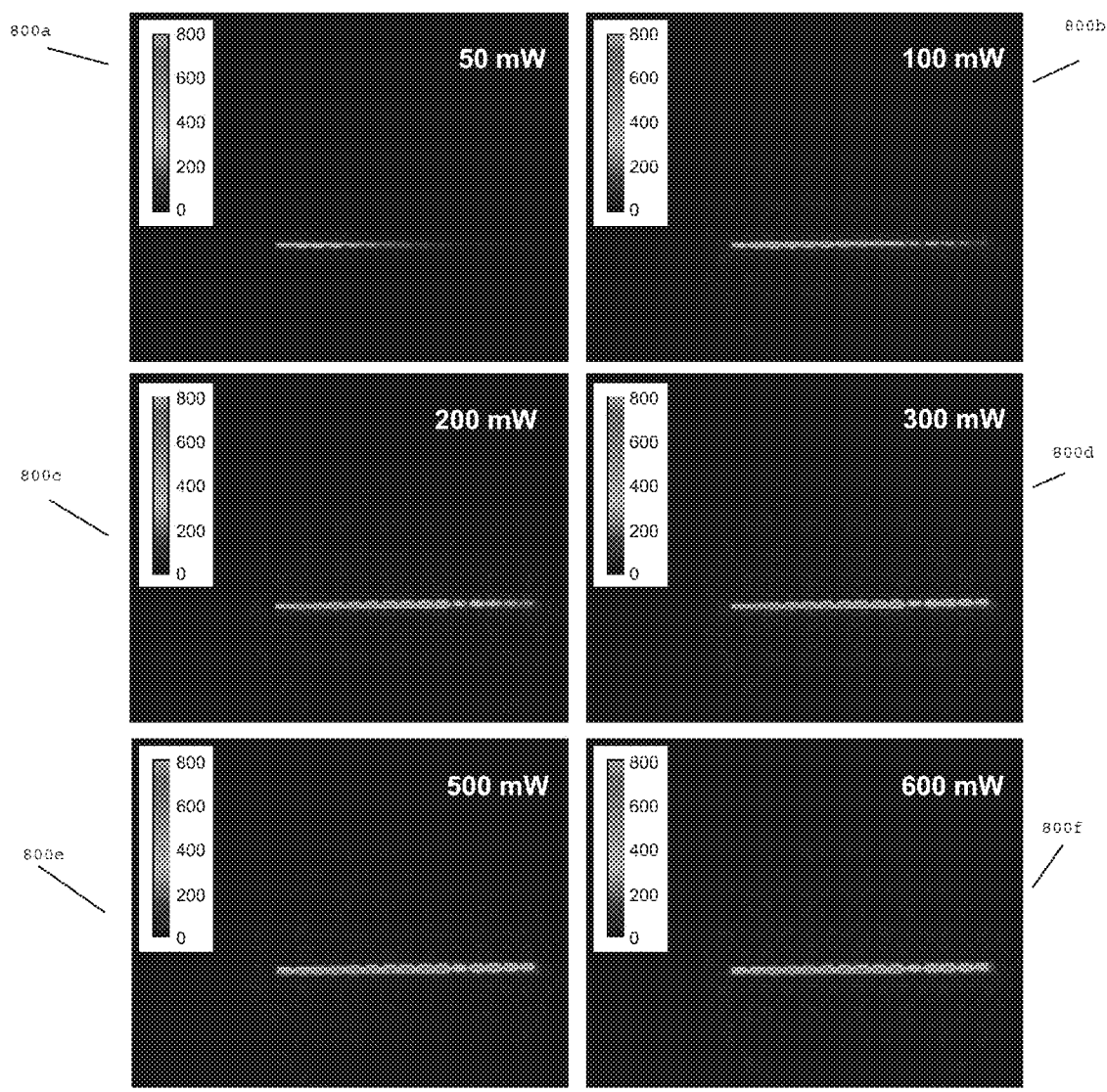
FIG. 8 shows a series of images of a laser induced fluorescence for a laser having a Ti:S laser pump at 811 nm with various optical pump powers and an input gas of argon, according illustrative embodiments of the technology.

FIG. 8 shows a series of images, 800a, 800b, 800c, 800d, 800e, and 800f, of a laser induced fluorescence for a laser having a Ti:S laser pump at 811 nm with various optical pump powers and an input gas of argon, according to illustrative embodiments of the laser.

The intensity corresponds to active regions of the micro-plasma where the metastable concentrations are the highest. For example, for low laser power of ~50 mW, the Ti:S laser is completely absorbed in the first half of a 1.9 cm path length of the micro-plasma. As the laser power increases (100-200 mW) the pump laser transmits increasingly longer path lengths of the argon metastables. When the Ti:S laser power increases to greater than 300 mW, the medium is transparent because the pump transition in the argon is saturated.

Figure 9A:
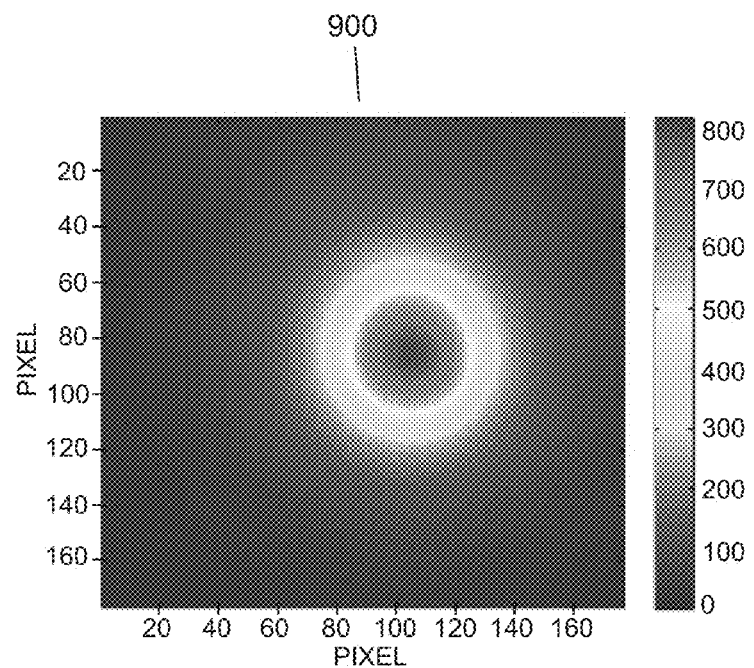
FIG. 9A is an image of an output laser beam, according to an embodiment of the technology.

FIG. 9A is an image 900 of an output laser beam, according to an embodiment of the technology.

Figure 9B:
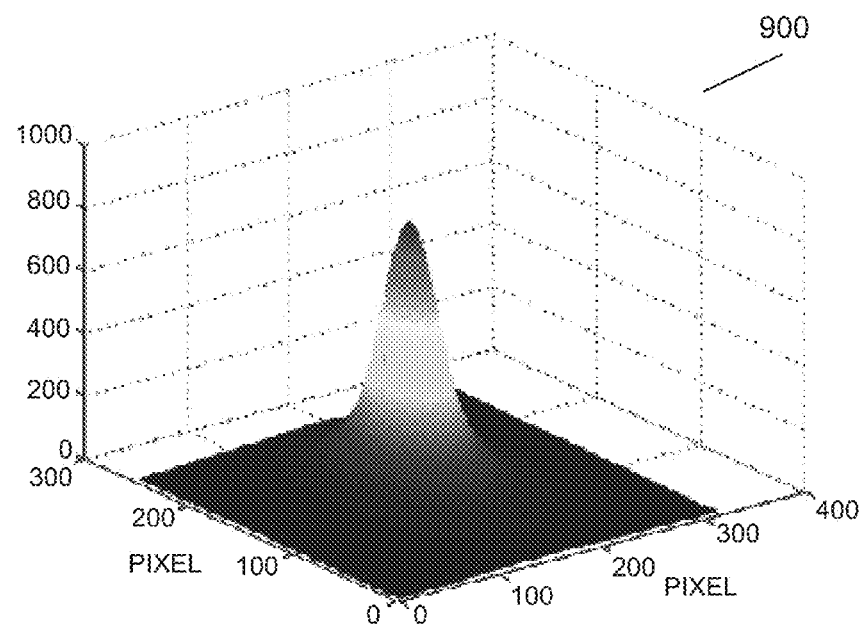
FIG. 9B is a graph 950 showing the output laser beam in FIG. 9A in a pixel view.

FIG. 9B is a graph 950 showing the output laser beam in FIG. 9A in a pixel view.

While the invention has been particularly shown and described with reference to specific embodiments, it should be understood by those skilled in the art that various changes in form and detail may be made therein without departing from the spirit and scope of the invention as defined by the appended claims.

What is claimed is:

1. A laser for providing a continuous wave output beam, the laser configured to receive light from a light source, the laser comprising:
   a micro-plasma chip;
   a resonant optical cavity for housing the micro-plasma chip at a location that allows a gas flowing within the resonant cavity to surround the micro-plasma chip, such that the micro-plasma chip generates a plurality of micro-plasmas that include excited metastable atoms; and
   an optical pump, positioned relative to the micro-plasma chip, to direct light from the light source onto the micro-plasmas to optically pump the metastable atoms to cause lasing of the gas sufficient to generate the continuous wave output beam.

2. The laser device of claim 1 wherein the gas is Argon, Helium, Neon, Krypton, Xenon, Nitrogen, Oxygen, or any combination thereof.

3. The laser device of claim 1 wherein the micro-plasma chip operates at a microwave frequency.

4. The laser device of claim 1 wherein the cavity is less than 2 cm in length.

5. The laser device of claim 1 where the cavity is between 1 cm and 100 cm in length.

6. The laser device of claim 1 further comprising a plurality of resonant optical cavities fluidly connected to each other, each of the plurality of cavities having a micro-plasma chip disposed therein and an optical resonator disposed relative to the micro-plasma chip.

7. The laser device of claim 1 wherein the micro-plasma chip includes multiple resonators that provide energy to the micro-plasmas.

8. The laser device of claim 6 wherein one of the multiple resonators receives power from a power source, such that said resonator provides power to the remaining resonators of the multiple resonators that do not receive power directly from the power source.

9. The laser device of claim 1 wherein the laser is configured to operate at atmospheric pressure.

10. A method for providing a continuous wave output beam from a laser, the laser configured to receive light from a light source, the method comprising:
   providing a flow of gas into a resonant optical cavity;
   applying power to a micro-plasma chip that is positioned within the resonant cavity at a location that allows the gas to surround the micro-plasma chip, causing the micro-plasma chip to generate a plurality of micro-plasmas that include excited metastable atoms; and
   directing light from the light source onto the plurality of micro-plasmas to optically pump the metastable atoms to cause lasing of the gas sufficient to generate the continuous wave output beam.

11. The method of claim 10 further comprising operating the micro-plasma chip at a microwave frequency.

12. The method of claim 10 further comprising providing a flow of Argon, Helium, Neon, Krypton, Xenon, or Nitrogen gas, or any combination thereof, into the resonant optical cavity.

13. The method of claim 10 further comprising providing a plurality of resonant optical cavities fluidly connecting each other, each of the plurality of cavities having a micro-plasma chip disposed therein and an optical resonator disposed relative to the micro-plasma chip.

14. The method of claim 10 further comprising providing power to one resonator of multiple resonators included the micro-plasma chip, such that said resonator provides power to the other resonators of the multiple resonators that do not receive power directly from the power source.

* * * * *